United States Patent
Jons et al.

(10) Patent No.: US 10,137,416 B2
(45) Date of Patent: Nov. 27, 2018

(54) FILTER ASSEMBLY INCLUDING SPIRAL WOUND MEMBRANE MODULE AND BRINE SEAL

(71) Applicant: Dow Global Technologies LLC, Midland, MI (US)

(72) Inventors: Steven D. Jons, Eden Prairie, MN (US); Jessica Y. Shu, Apple Valley, MN (US); Michael S. Koreltz, Bloomington, MN (US); Luke Franklin, Minneapolis, MN (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 15/580,182

(22) PCT Filed: Jul. 11, 2016

(86) PCT No.: PCT/US2016/041682
§ 371 (c)(1),
(2) Date: Dec. 6, 2017

(87) PCT Pub. No.: WO2017/019282
PCT Pub. Date: Feb. 2, 2017

(65) Prior Publication Data
US 2018/0141005 A1 May 24, 2018

Related U.S. Application Data

(60) Provisional application No. 62/198,283, filed on Jul. 29, 2015.

(51) Int. Cl.
*B01D 63/10* (2006.01)

(52) U.S. Cl.
CPC .......... *B01D 63/103* (2013.01); *B01D 63/10* (2013.01); *B01D 2313/04* (2013.01);
(Continued)

(58) Field of Classification Search
None
See application file for complete search history.

(56) References Cited

U.S. PATENT DOCUMENTS 4,016,083 A 4/1977 Sakaguchi et al.
4,214,994 A 7/1980 Kitano et al.
(Continued)

FOREIGN PATENT DOCUMENTS

CN 201799220 4/2011
JP 1037560 A 2/1989
(Continued)

*Primary Examiner* — Krishnan S Menon
(74) *Attorney, Agent, or Firm* — Kenneth Crimaldi (57) ABSTRACT

A filter assembly adapted for insertion into an inner chamber of a pressure vessel, wherein the assembly includes: a spiral wound membrane module including at least one membrane envelope and feed spacer sheet concentrically wound about a central permeate tube extending along an axis (X) forming an inlet scroll face and outlet scroll face and a cylindrical outer peripheral surface, and a brine seal disposed concentrically about a portion of the outer peripheral surface; characterized by the brine seal including: i) a radially extending flexible lip defining a maximum outer diameter adapted to engage the inner chamber of the pressure vessel, ii) an end cap surface covering a portion of the first scroll face, and iii) at least one opening in the end cap surface for permitting fluid to flow through the inlet scroll face and into the feed spacer sheet of the module.

6 Claims, 5 Drawing Sheets (52) U.S. Cl.
CPC .... *B01D 2313/08* (2013.01); *B01D 2313/143* (2013.01); *B01D 2313/20* (2013.01); *B01D 2313/21* (2013.01)

(56) References Cited

U.S. PATENT DOCUMENTS

| | | | |
|---|---|---|---|
| 4,277,344 A | 7/1981 | Cadotte | |
| 4,299,702 A | 11/1981 | Bairinji et al. | |
| 4,600,512 A | 7/1986 | Aid | |
| 4,795,559 A | 1/1989 | Shingou et al. | |
| 5,128,037 A | 7/1992 | Pearl et al. | |
| 5,304,312 A * | 4/1994 | Forster | B01D 25/24 210/808 |
| 5,389,260 A | 2/1995 | Hemp et al. | |
| 5,435,957 A | 7/1995 | Degen et al. | |
| 5,458,774 A | 10/1995 | Mannapperuma | |
| 5,538,642 A | 7/1996 | Solie | |
| 5,851,267 A | 12/1998 | Schwartz | |
| 5,919,026 A | 7/1999 | Appleton | |
| 6,156,680 A | 12/2000 | Goettmann | |
| 6,299,772 B1 | 10/2001 | Huschke et al. | |
| 6,432,310 B1 * | 8/2002 | Andou | B01D 61/022 210/321.74 |
| 6,878,278 B2 | 4/2005 | Mickols | |
| 6,881,336 B2 | 4/2005 | Johnson | |
| 7,048,855 B2 | 5/2006 | de la Cruz | |
| 7,208,088 B2 | 4/2007 | Almasian et al. | |
| 7,875,177 B2 | 1/2011 | Haynes et al. | |
| 7,951,295 B2 | 5/2011 | Larson et al. | |
| 8,110,016 B2 | 2/2012 | McCollam | |
| 8,142,588 B2 | 3/2012 | McCollam | |
| 8,337,698 B2 | 12/2012 | Hou | |
| 8,377,300 B2 | 2/2013 | Katayama et al. | |
| 8,388,842 B2 | 3/2013 | Shelby et al. | |
| 8,388,848 B2 | 3/2013 | Odaka et al. | |
| 8,425,773 B2 | 4/2013 | Bonta et al. | |
| 8,778,182 B2 | 4/2014 | Johnson et al. | |
| 8,728,213 B2 | 5/2014 | Elwell et al. | |
| 2003/0205520 A1 | 11/2003 | Johnson | |
| 2004/0182774 A1 | 9/2004 | Hirokawa et al. | |
| 2008/0295951 A1 | 12/2008 | Hiro et al. | |
| 2009/0095670 A1 * | 4/2009 | Uda | B01D 63/106 210/232 |
| 2013/0146532 A1 | 6/2013 | Dontula et al. | |
| 2014/0042080 A1 | 2/2014 | Hou et al. | |
| 2014/0183134 A1 | 7/2014 | Herron | |
| 2017/0056832 A1 | 3/2017 | Jons et al. | |

FOREIGN PATENT DOCUMENTS

| | | |
|---|---|---|
| JP | 2005279556 | 10/2005 |
| JP | 2013071098 | 4/2013 |

* cited by examiner

FILTER ASSEMBLY INCLUDING SPIRAL WOUND MEMBRANE MODULE AND BRINE SEAL

FIELD

The invention relates to filter assemblies including a spiral wound membrane module and associated brine seal.

INTRODUCTION

Spiral wound membrane modules are used in a variety of reverse osmosis (RO) and nanofiltration (NF) applications. In a typical embodiment, a cylindrical spiral wound membrane module is constructed by winding one or more membrane envelopes and feed spacers concentrically about the permeate collection tube to form two opposing scroll faces and an outer peripheral surface. The resulting spiral bundle is held in place by tape or other means. Various types of seals may be applied about the outer peripheral surface of module prior to installing the module within an inner chamber of a pressure vessel. Representative examples are described in: U.S. Pat. No. 4,016,083, U.S. Pat. No. 4,299,702, U.S. Pat. No. 4,600,512, U.S. Pat. No. 5,128,037, U.S. Pat. No. 5,389,260, U.S. Pat. No. 5,851,267, U.S. Pat. No. 6,299,772, U.S. Pat. No. 7,208,088, U.S. Pat. No. 8,110,016, U.S. Pat. No. 8,377,300, U.S. Pat. No. 8,388,842, U.S. Pat. No. 8,425,773, U.S. Pat. No. 8,728,213 and U.S. Pat. No. 8,778,182. A wide variety of feed spacers and flow configurations are described for use with such modules. See for example: U.S. Pat. No. 5,458,774, U.S. Pat. No. 6,881,336, U.S. Pat. No. 8,337,698, US 2003/205520, US 2004/0182774, US2013/146532, US2014/042080, US2014/183134, JP2013/071098 and CN201799220.

In operation, pressurized feed fluid is passed across the surface of the membrane envelope and the applied pressure causes a portion of the "solvent" (e.g. water) to pass through the membrane (i.e. forming a "permeate"), while "solutes" (e.g. salts) are unable to pass through the membrane and are concentrated in the remaining feed (i.e. forming a "concentrate" solution). The "recovery" is defined as the percentage of feed solution passing through the membrane as permeate. Scale formation is a major problem when operating at high recoveries. Once concentrated beyond their solubility limit, retained salts (e.g. $CaCO_3$, $CaSO_4$) begin to form scale on the membrane. This is especially problematic for long term operation of residential RO systems. In contrast with larger industrial systems that operate at high recoveries by using pH adjustment, scale inhibitors, or frequent cleanings, most residential systems have none of these options. Spiral wound modules used in residential RO systems are typically designed to operate at recoveries between 20-35%. Operating at higher recoveries (e.g. above 35%) leads to scaling as un-softened residential water sources frequently contain significant quantities of calcium and bicarbonate ions.

New filter assembly designs are sought that permit higher recovery operation with reduced susceptibility to scaling.

SUMMARY

A filter assembly adapted for insertion into an inner chamber of a pressure vessel, wherein the assembly includes: a spiral wound membrane module including at least one membrane envelope and feed spacer sheet concentrically wound about a central permeate tube extending along an axis (X) forming an inlet scroll face and outlet scroll face and a cylindrical outer peripheral surface, and a brine seal disposed concentrically about a portion of the outer peripheral surface; characterized by the brine seal including:

i) a radially extending flexible lip defining a maximum outer diameter adapted to engage the inner chamber of the pressure vessel, ii) an end cap surface covering a portion of the first scroll face, and iii) at least one opening in the end cap surface for permitting fluid to flow through the inlet scroll face and into the feed spacer sheet of the module.

In one embodiment, the filter assemblies adapted to mitigate the formation of scale on the membrane—particularly when the assembly is operated at recoveries greater than 35%. In another embodiment, the assembly promotes a radial feed flow path through the module which reduces flux in regions of high concentrations of scale-forming ions. In yet another embodiment, the assembly provides a higher feed flow velocity than is typical for the same operating recovery. In still another embodiment, the assembly provides an improved method to prevent feed flow bypass, which is particularly important for resulting higher feed-side pressure drops. Many additional embodiments are described.

BRIEF DESCRIPTION OF THE DRAWINGS

FIGS. 4a, 4b, and 4c are perspective views illustrating several embodiments of brine seals and spiral wound modules. In FIG. 4c, the brine seal and spiral wound module are joined to form an assembly.

DETAILED DESCRIPTION

The invention includes a filter assembly including a spiral wound membrane module. A representative spiral wound membrane module is generally shown at 2 in FIG. 1. The module (2) is formed by concentrically winding one or more membrane envelopes (4) and feed spacer sheet(s) ("feed spacers") (6) about a permeate collection tube (8) extending along an axis (X). Each membrane envelope (4) preferably comprises two substantially rectangular sections of membrane sheet (10, 10'). Each section of membrane sheet (10, 10') has a membrane or front side (34) and support or back side (36). The membrane envelope (4) is formed by overlaying membrane sheets (10, 10') and aligning their edges. In a preferred embodiment, the sections (10, 10') of membrane sheet surround a permeate spacer sheet (12). This sandwich-type structure is secured together, e.g. by sealant (14), along three edges (16, 18, 20) to form an envelope (4) while a fourth edge, i.e. "proximal edge" (22) abuts the permeate collection tube (8) so that the inside portion of the envelope (4) (and optional permeate spacer (12)) is in fluid communication with a plurality of openings (24) extending along the length of the permeate collection tube (8). The active membrane region (25) for each section of membrane sheet (10, 10') corresponds to the area of membrane through which liquid may pass into the envelope (4) during operation; (in contrast to non-active membrane regions (25') that are isolated by adhesives, tapes, etc. so that the flow of liquid through the membrane and into the inside of the permeate envelope is prevented). The module (2) may include a single envelope or a plurality of membrane envelopes (4) each separated by a feed spacer sheet (6). In the illustrated embodiment, membrane envelopes (4) are formed by joining the back side (36) surfaces of adjacently positioned membrane leaf packets. A membrane leaf packet comprises a substantially rectangular membrane sheet (10) folded upon itself to define two membrane "leaves" wherein the front sides (34) of each leaf are facing each other and the fold is axially aligned with the proximal edge (22) of the membrane envelope (4), i.e. parallel with the permeate collection tube (8). A feed spacer sheet (6) is shown located between facing front sides (34) of the folded membrane sheet (10). The feed spacer sheet (6) facilitates flow of feed fluid through the module (2). While not shown, additional intermediate layers may also be included in the assembly. Representative examples of membrane leaf packets and their fabrication are further described in U.S. Pat. No. 7,875,177 to Haynes et al.

During module fabrication, permeate spacer sheets (12) may be attached about the circumference of the permeate collection tube (8) with membrane leaf packets interleaved therebetween. The back sides (36) of adjacently positioned membrane leaves (10, 10') are sealed about portions of their periphery (16, 18, 20) to enclose the permeate spacer sheet (12) and to form a membrane envelope (4). Suitable techniques for attaching the permeate spacer sheet to the permeate collection tube are described in U.S. Pat. No. 5,538,642 to Solie. The membrane envelope(s) (4) and feed spacer(s) (6) are wound or "rolled" concentrically about the permeate collection tube (8) to form two opposing scroll faces (inlet scroll face (30) and outlet scroll face (32)), with the distal ends of membrane leaves forming a cylindrical periphery (39). The resulting spiral bundle is held in place by tape or other means. The scroll faces (30, 32) of the module may then be trimmed and a sealant may optionally be applied at the junction between the scroll face (30, 32) and permeate collection tube (8) as described in U.S. Pat. No. 7,951,295 to Larson et al. An outer peripheral surface (38) may be formed about the cylindrical periphery (39). The outer peripheral surface (38) may comprise an impermeable layer (78), such as a fiberglass coating, applied to the module's cylindrical periphery (39). Alternatively, a tape layer may be used as described in U.S. Pat. No. 8,142,588 to McCollam. See also JP 2005/279556 and JP 1037560. In yet another embodiment, a porous material may be selected to form a porous outer surface (80) through which liquid may flow. In one embodiment, a layer (e.g. tape or heat shrink) may be applied, wherein the layer includes holes across all or a part of the outer peripheral surface (38). Similarly, other outer surfaces or coating materials may be used and made porous before or after application to the module's cylindrical periphery (39). In a preferred embodiment, a brine seal (65) is disposed about a portion of the outer peripheral surface (38) of the module (2), and the outer peripheral surface (38) is porous only in locations downstream of the brine seal (65).

Membranes used for this application may be classified as reverse osmosis or nanofiltration. RO membranes used to form envelopes are relatively impermeable to virtually all dissolved salts and typically reject more than about 95% of salts having monovalent ions such as sodium chloride. RO membranes also typically reject more than about 95% of inorganic molecules as well as organic molecules with molecular weights greater than approximately 100 Daltons. NF membranes are more permeable than RO membranes and typically reject less than about 95% of salts having monovalent ions while rejecting more than about 50% (and often more than 90%) of salts having divalent ions—depending upon the species of divalent ion. NF membranes also typically reject particles in the nanometer range as well as organic molecules having molecular weights greater than approximately 200 to 500 Daltons. For purposes of this description, the term "hyperfiltration" encompasses both RO and NF.

The membrane sheet is not particularly limited and a wide variety of materials may be used, e.g. cellulose acetate materials, polysulfone, polyether sulfone, polyamides, polysulfonamide, polyvinylidene fluoride, etc. A preferred membrane is a three layer composite comprising 1) a backing layer (back side) of a nonwoven backing web (e.g. a non-woven fabric such as polyester fiber fabric available from Awa Paper Company), 2) a middle layer comprising a porous support having a typical thickness of about 25-125 μm and 3) a top discriminating layer (front side) comprising a thin film polyamide layer having a thickness typically less than about 1 micron, e.g. from 0.01 micron to 1 micron but more commonly from about 0.01 to 0.1 μm. The backing layer is not particularly limited but preferably comprises a non-woven fabric or fibrous web mat including fibers which may be orientated. Alternatively, a woven fabric such as sail cloth may be used. Representative examples are described in U.S. Pat. No. 4,214,994, U.S. Pat. No. 4,795,559, U.S. Pat. No. 5,435,957, U.S. Pat. No. 5,919,026, U.S. Pat. No. 6,156,680, US 2008/0295951 and U.S. Pat. No. 7,048,855. The porous support is typically a polymeric material having pore sizes which are of sufficient size to permit essentially unrestricted passage of permeate but not large enough so as to interfere with the bridging over of a thin film polyamide layer formed thereon. For example, the pore size of the support preferably ranges from about 0.001 to 0.5 μm. Non-limiting examples of porous supports include those made of: polysulfone, polyether sulfone, polyimide, polyamide, polyetherimide, polyacrylonitrile, poly(methyl methacrylate), polyethylene, polypropylene, and various halogenated polymers such as polyvinylidene fluoride. The discriminating layer is preferably formed by an interfacial polycondensation reaction upon the surface of the microporous polymer layer. Due to its relative thinness, the resulting polyamide layer is often described in terms of its coating coverage or loading upon the porous support, e.g. from about 2 to 5000 mg of polyamide per square meter surface area of porous support and more preferably from about 50 to 500 mg/m$^2$.

The proto-typical membranes for reverse osmosis are FilmTec Corporation's FT-30™ type membranes, made by reaction of m-phenylene diamine and trimesoyl chloride. This and other interfacial polycondensation reactions are described in several sources (e.g. U.S. Pat. No. 4,277,344 and U.S. Pat. No. 6,878,278). The polyamide membrane layer may be prepared by interfacially polymerizing a polyfunctional amine monomer with a polyfunctional acyl halide monomer, (wherein each term is intended to refer both to the use of a single species or multiple species), on at least one surface of a porous support. As used herein, the term "polyamide" refers to a polymer in which amide linkages (—C(O)NH—) occur along the molecular chain. The polyfunctional amine and polyfunctional acyl halide monomers are most commonly applied to the porous support by way of a coating step from solution, wherein the polyfunctional amine monomer is typically coated from an aqueous-based or polar solution and the polyfunctional acyl halide from an organic-based or non-polar solution.

Other materials for constructing various components of spiral wound modules are well known in the art. Suitable sealants for sealing membrane envelopes include urethanes, epoxies, silicones, acrylates, hot melt adhesives and UV curable adhesives. While less common, other sealing means may also be used such as application of heat, pressure, ultrasonic welding and tape. Permeate collection tubes are typically made from plastic materials such as acrylonitrile-butadiene-styrene, polyvinyl chloride, polysulfone, poly(phenylene oxide), polystyrene, polypropylene, polyethylene or the like. Tricot polyester materials are commonly used as permeate spacers. Additional permeate spacers are described in U.S. Pat. No. 8,388,848.

Figure 1:
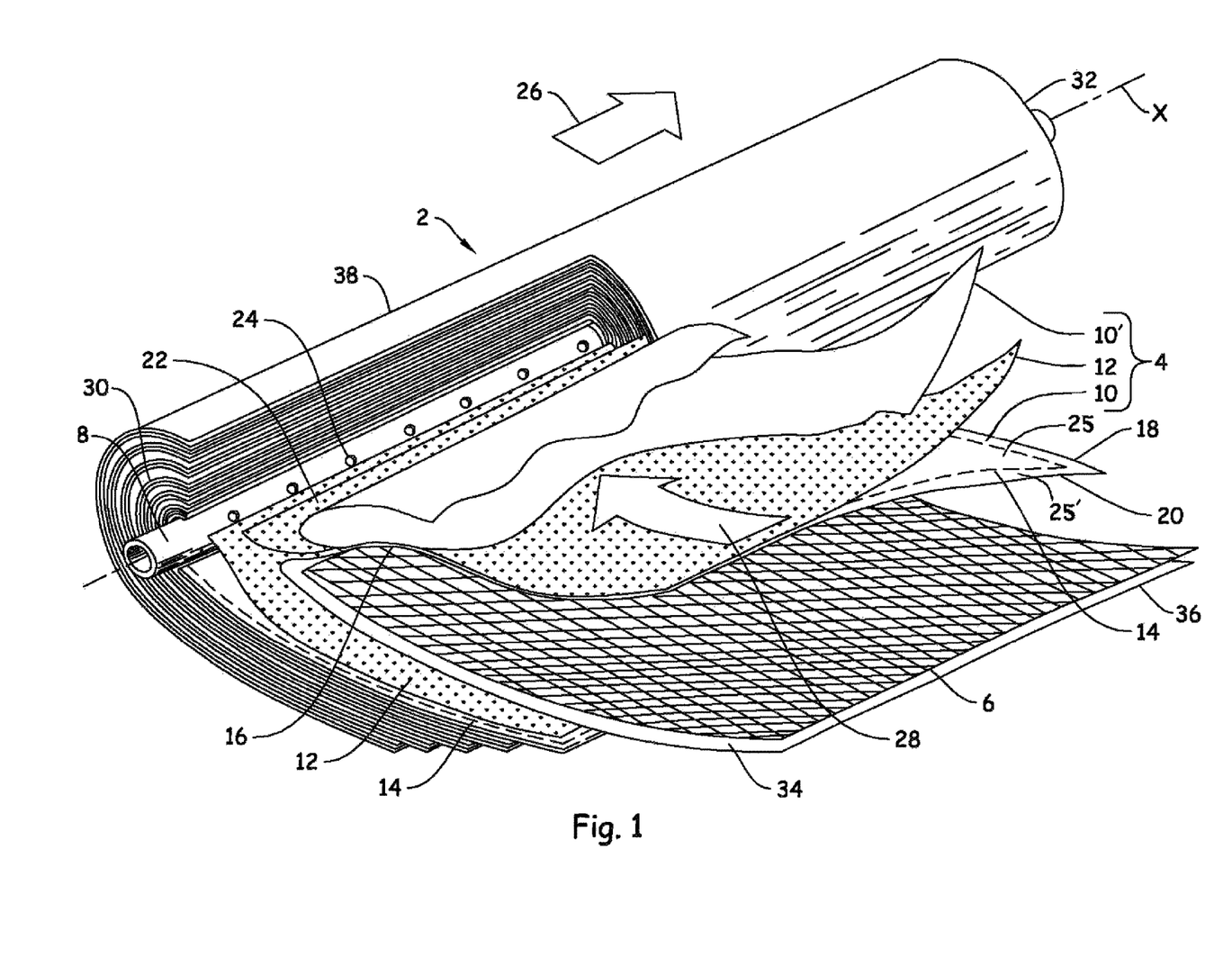
FIG. 1 is a perspective, partially cut-away view of a spiral wound membrane module.

In operation, a pressurized feed solution passes across the front side (34) of membrane leaves (10, 10'), and it is separated into concentrate and permeate streams Arrows in FIG. 1 illustrate general flow directions (26, 28) of feed and permeate through a conventional module (2). Feed fluid enters the module (2) from the inlet scroll face (30) and exits the module (as concentrate) from the outlet scroll face (32). Permeate fluid that has passed through the membrane flows along the permeate spacer sheet (12) in a direction generally perpendicular to the permeate collection tube (8) (i.e. axis X) as indicated by arrow (28).

Figure 2A:
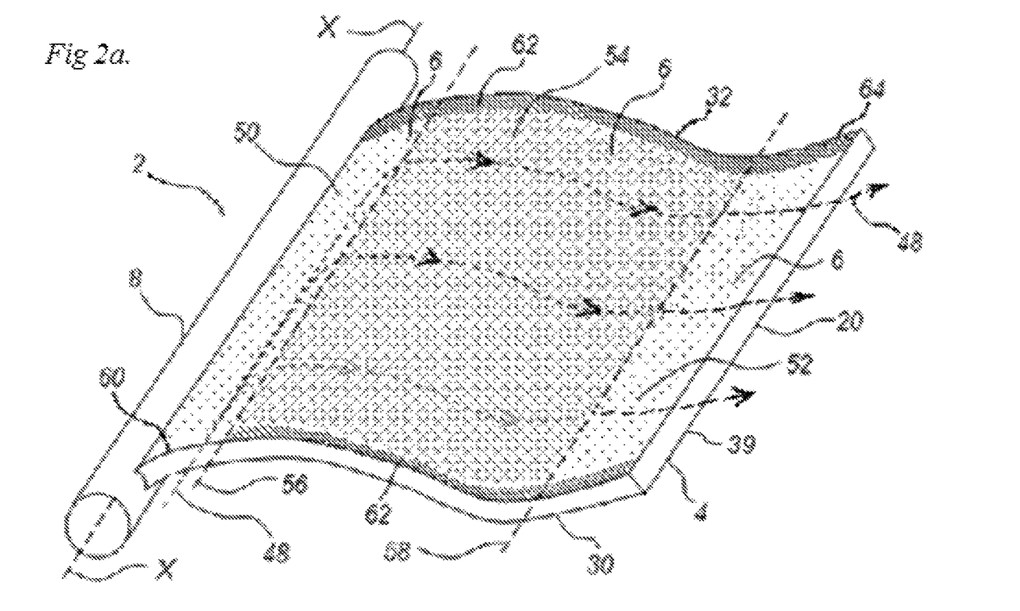
FIGS. 2a and 2b are perspective views of partially assembled spiral wound membrane modules.
Figure 2B:
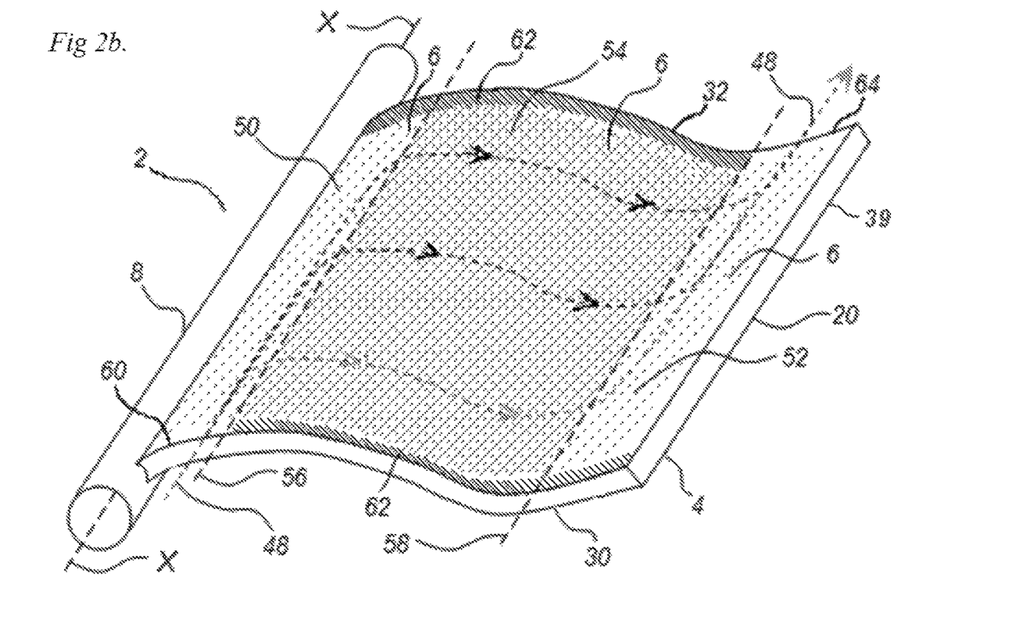

FIGS. 2a and b illustrates alternative embodiments of the module (2) wherein the dominate feed flow is in a radial direction relative to the permeate collection tube (8). In these views the modules (2) are shown in an unwound state to better illustrate feed flow directions. Dotted arrows (48) illustrate feed flow pathways within the feed spacer sheet (6) that are predominantly from the permeate tube towards the distal end (20) of membrane sheets. For purposes of this invention, a module has an outward radial flow path if the majority of feed enters near the permeate tube (8), exits near the peripheral surface (38), and the magnitude of the feed velocity component perpendicular to a central axis (X) of the permeate tube (8) is greater than 50% of the feed velocity for a majority of the active membrane region (25). Flow paths in FIG. 2a are consistent with the feed exiting the module from its outer peripheral surface (38). In FIG. 2b, flow paths are consistent with feed exiting the module from the outlet scroll face (32) near the outer peripheral surface (38) of the module. Preferred arrangements include these flow paths, as well as arrangements where feed exits from both the peripheral surface (38) and the outlet scroll face (32).

The feed spacer sheet (6) preferably comprises a sheet of polymeric web or net material including a plurality of crossing filaments, similar to those available under the trade name VEXAR™ from Conwed Plastics or as described in U.S. Pat. No. 6,881,336 to Johnson. In a preferred embodiment, the feed spacer is less than 0.5 mm thick. Preferably, the feed spacer has a median resistance to flow perpendicular to the permeate collection tube (8) is greater than 0.5 psi/ft, more preferably greater than 1 psi/ft, or even greater than 2 psi/ft, when measured at 25° C. with an average flow velocity of 15 cm/sec. In one embodiment, the feed spacer has uniform resistance to flow throughout the module.

In one preferred embodiment, the feed spacer sheet (6) includes: i) a feed entrance section (50) extending along the permeate collection tube (8) from the inlet scroll face (30) toward the outlet scroll face (32), ii) a feed exit section (52) extending along near the outer peripheral surface (38) (i.e. adjacent the distal edge of membrane envelope (20)) from the outlet scroll face (32) toward the inlet scroll face (30), and iii) a central feed section (54) located between the feed entrance section (50) and the feed exit section (52). The feed entrance section (50) and central feed section (54) of the feed spacer sheet (6) may each have a distinct median resistance to flow; wherein the term "resistance to flow" refers to the pressure drop per unit of distance at a water velocity of 1 cm/second at 25° C. More specifically, the feed entrance section (50) has a median resistance to fluid in a direction parallel to the permeate collection tube (8) that is less than 25% of the median resistance to flow of the central feed section (54) in a direction perpendicular to the permeate collection tube (8). In another preferred embodiment, the feed exit section (52) of the feed spacer sheet (6) also has a median resistance to flow that is less than 25% of the median resistance to flow of the central feed section (54) in a direction perpendicular to the permeate collection tube (8). In this way, the feed entrance (50) and exit (52) sections effectively serve as low resistance flow distributors for feed fluid to flow to and from the central feed section (54). Preferably, the median resistance to flow perpendicular to the permeate collection tube (8) in the central feed section (54) is greater than 0.5 psi/ft (11.2 kPa/m), more preferably greater than 1 psi/ft (22.6 kPa/m), or even greater than 2 psi/ft (45.2 kPa/m), when measured at 25° C. with an average flow velocity of 15 cm/sec. The median resistance to flow parallel to the permeate collection tube (8) in the feed entrance section (50) and/or feed exit section (52) is preferably less than 1.0 psi/ft (22.6 kPa/m), more preferably less than 0.5 psi/ft (11.2 kPa/m), or even less than 0.25 psi/ft (5.7 kPa/m), when measured at 25° C. with a flow velocity of 15 cm/sec.

The feed spacer sheet (6) may be in the form of a single sheet with distinct sections (feed entrance (50), feed exit (52) and central feed (54)) having different resistances to flow, or may comprise separate sections that may be optionally secured together to facilitate module assembly. For example, the feed spacer sheet (6) may be produced with sections having different thicknesses, free volume, number of filaments, angles between filament, and strand thinning. Orientation of the feed spacer relative to the direction of flow (48) can also be used to vary flow resistance in a specified direction. For example, the same spacer material may be used within the central feed section (54) as in the feed entrance section (50) and feed exit sections (52) but can be made "distinct" by orientating individual filaments (e.g. at 90°) in a manner to change its resistance to flow in a direction parallel to permeate collection tube (8), (i.e. axis X). Preferably, the central feed section (54) contains a net oriented to provide lower flow resistance in the direction perpendicular to the permeate tube (8). Preferably, the feed entrance section (50) and/or feed exit section (52) contains a net oriented to provide lower flow resistance in the direction parallel to the permeate collection tube (8).

In another embodiment, resistance to feed flow parallel to the permeate collection tube (8) may be reduced by modifying a component of the feed spacer sheet (6) in one or more sections throughout the feed spacer sheet (6). For instance, regions of a net in the feed entrance section (50) and/or feed exit section (52) may be cut out. Preferably, removed sections are elongated and oriented in the direction of the permeate collection tube (8). Alternatively, flow channels may be embossed into a net to make flow easier in the direction of the permeate tube (8). In yet another alternative embodiment, the entire of spacer sheet (6) may include a first spacer sheet type, and a lower resistance layer may be added to overlap the first spacer sheet type in one or both the feed entrance and feed exit sections (50, 52) of the feed spacer sheet (6), thus lowering the resistance to flow within a given section. More generally, the module (2) may include a first spacer sheet type located within the central feed section (52) and either the feed entrance section (50) or the feed exit section (52) of the feed spacer sheet (6) may include both a first spacer sheet type and an overlapping second spacer type with the second spacer sheet type preferably having less median resistance to flow in a direction parallel to the permeate collection tube (8) than the first spacer sheet type. More preferably, the second spacer sheet type is a net oriented to have less resistance to flow in the direction parallel to the permeate collection tube (8) than in the direction perpendicular to the permeate collection tube (8). The second spacer type may be affixed to the first spacer sheet type to aid in module rolling. The feed entrance section (50) and feed exit section (52) of the feed spacer sheet (6) are shown in FIG. 2 as being separated from the central feed section (54) by dotted lines (56, 58). While not shown to scale in FIG. 2, the feed entrance section (50) and feed exit section (52) each preferably comprise less than 20% (and more preferably less than 15% or event 10%) of the total area of the feed spacer sheet (6) with the central feed section (54) comprising the majority (e.g. 60%, 75%, 90%, etc.) of the total area. In the preferred embodiment shown, the feed entrance and exit sections (50, 52) are generally rectangular shaped and are located along the permeate collection tube (8) and near the outer peripheral surface (38), respectively. In a yet another preferred embodiment, a majority (over 50% of area) of the feed exit section (52) of the feed spacer sheet (6) is in planar contact with the non-active membrane region (25') of the membrane sheet (10), preferably at a location between the active membrane region (25) and module's peripheral surface (38). In a still further preferred embodiment, the feed exit section (52) only contacts non-active membrane regions (25') of a membrane sheet (10) at points distal to its active membrane region (25).

In operation, feed flows into the feed entrance region (60) located on the inlet scroll face (30) adjacent to the permeate collection tube (8), flows axially along the permeate collection tube (8) within the feed entrance section (50) and then flows radially through the central feed section (54) toward the outer peripheral surface (38). FIG. 2a shows flow paths consistent with feed leaving as reject near through a porous outer peripheral surface (38). FIG. 2b indicates a change in feed flow direction within the feed exit section (52), where feed subsequently flows axially to exit the module (2) at a feed exit region (64) located on the outlet scroll face (32) adjacent the cylindrical periphery (39). Thus, in accordance with a preferred embodiment of the invention, feed flow encounters a relatively low resistance to flow when entering the module and passing through the feed entrance section (50). This area of low resistance allows feed to be redirected in a radial direction while preventing "dead" regions near the permeate collection tube (8) where feed velocity may otherwise slow. Moreover, the feed exit section (52) allows feed flow to maintain high and uniform velocity across the active membrane (25) near the module's periphery (39), where sealant concentration is highest. Because the module's periphery (39) (near the distal ends of membrane envelope (4)), is where permeate back pressure is the greatest, flux is reduced at this location. As a consequence, scaling is much less likely to occur, making the spiral wound membrane module capable of operating at higher recovery rates than conventional designs.

Figure 3:
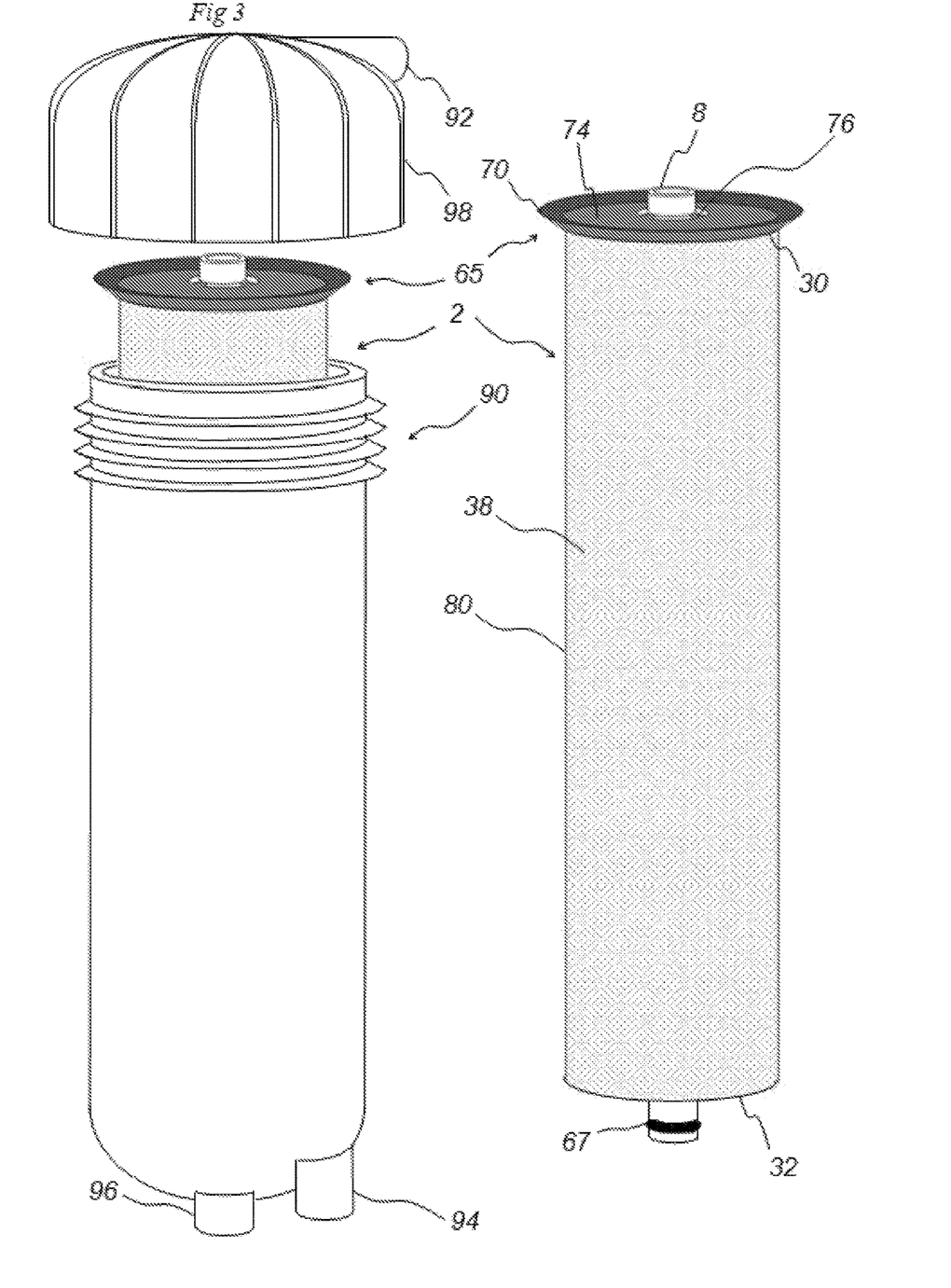
FIG. 3 is a perspective view of an embodiment of the filter assembly including a spiral wound membrane module including a brine seal, and a perspective view of the assembly loaded into a pressure vessel.

As shown in FIG. 3, the filter assembly further includes a brine seal (65) disposed concentrically about a portion of the outer peripheral surface (38) of the module (2). The brine seal (65) includes: i) a radially extending flexible lip (70) defining a maximum outer diameter adapted to engage an inner chamber (89) of a pressure vessel (90), ii) an end cap surface (72) covering a portion of the first scroll face (30), and iii) at least one opening (76) in the end cap surface (72) for permitting fluid to flow through the scroll face (30) and into the feed spacer sheet (6) of the module (2). The lip (70) and end cap surface (72) may comprise separate parts that can be separately installed and thereafter sealed to one another (e.g. by application of adhesive, sealant, hot-melt polymer, etc.). In a preferred embodiment, the lip (70) and end cap surface (72) comprise a single integral unit of non-porous (preferably elastomeric) material. The end cap surface (72) may be sealed to the first scroll face (30), e.g. by way of application of sealant, adhesive, hot melt polymer, etc. In order to restrict feed flow into the module via the first scroll end, the end cap surface (72) preferably covers at least 75% of the first scroll face (30) with one or more openings (76) located adjacent the permeate collection tube (8). This configuration facilitates feed flow as previously described with reference to FIGS. 2a and 2b. The outer peripheral surface (38) of the module (2) may include a porous surface (80), e.g. a porous layer of tape, consistent with the flow path embodiment illustrated in FIG. 2a.

As further shown in FIG. 3, the filter assembly is designed to be installed within an inner chamber (89) of a pressure vessel (90)—as per standard practice in the industry. The selection of pressure vessel (90) is not particularly limited but preferable includes a solid structure capable of withstanding pressures used during operations. The vessel structure preferably includes a cylindrical inner chamber (89) having an inner diameter slightly larger than the outer diameter of the outer peripheral surface (38) of the module or modules to be housed therein. In the illustrated embodiment, the pressure vessel (90) includes a feed inlet (92) located at one end of the chamber (89), a concentrate outlet (94) preferably located at the opposite end of the chamber and at least one permeate outlet (96). The pressure vessel (90) may also include one or more end pieces (98) that seal the inner chamber (89) once loaded with one or more modules (2). Once the module (2) is loaded in the pressure vessel (90), the lip (70) of the brine seal (65) engages the inner chamber (89) of a pressure vessel (90) and limits feed flow from by-passing around the first scroll face (30). In a preferred embodiment, the lip (70) has a directional bias (e.g. expands in diameter due to a directional difference in pressure across the seal). In particular, the lip (70) flexes radially outward when subject to fluid pressure that is greater at the first scroll face (30) than the second scroll face (32).

Figures 4A, 4B:
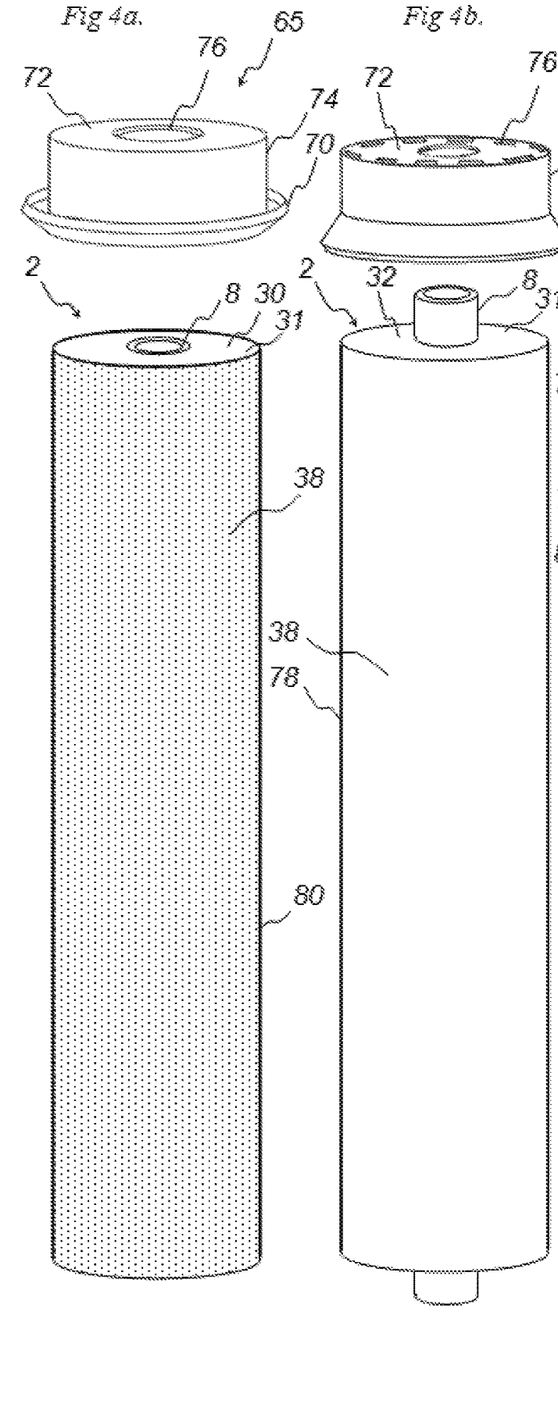
Figure 4C:
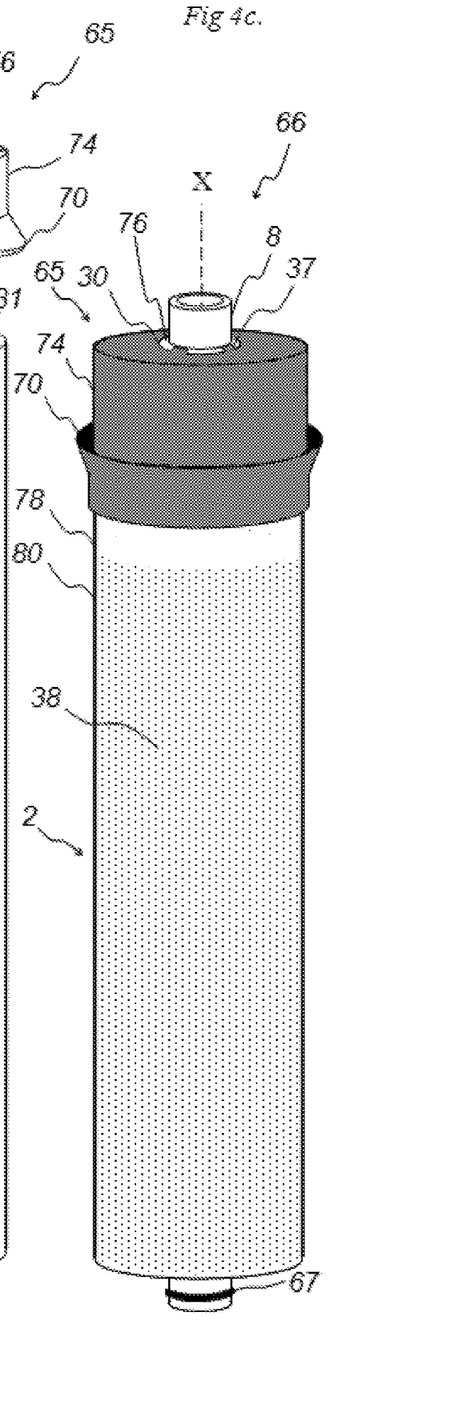

In the embodiment of FIG. 3, the radially extending flexible lip (70) is sealed to the end cap surface (72) and positioned upstream of a first scroll face (30). In the embodiments of FIGS. 4a-c, the radially extending flexible lip (70) encircles the module (2) around a location between the two scroll faces (30, 32). In either case, a change in shape of the lip (70) allows engagement with the inner chamber of the pressure vessel (90). The end cap surface (72) is located perpendicular to the central axis (X) that abuts one of the two module scroll faces (30, 32), generically referred to as the "abutted scroll face (31)". Preferably, the end cap surface (72) covers at least 75%, 80% or even 90% of the abutted scroll face (31). For purposes of description, the scroll face area corresponds to the cross section of the annular region between the permeate tube (8) and peripheral surface (38) consisting of membrane, feed spacer, permeate spacer, and associated adhesive. Preferably, the end cap surface (72) is sealed with a part of the abutting scroll face (31), such as by either an elastic surface or an adhesive (e.g. melt polymer or a reactive adhesive). In another preferred embodiment, the end cap surface (72) may be positioned against a whole or a part of the permeate tube (8). The end cap surface (72) restricts flow through a majority of the abutted scroll face (31). However, the end cap surface (72) includes at least one opening (76) to allow feed fluid to flow from outside the module (2) into the feed spacer (6) within the module. The openings(s) in the end cap surface (72) may be located nearer either the permeate collection tube (8) or the module's outer peripheral surface (38). In a preferred embodiment, an opening (76) in the end cap surface (72) is located near the permeate collection tube (8). In this case, it is further preferred that the lip (70) of the brine seal (65) is directionally biased and that an enhanced seal against the inner chamber (89) of the pressure vessel (90) is provided when greater pressure is applied to the module's scroll face (31) that abuts the end cap surface (72) than is applied the opposing scroll face. In an alternative embodiment, a plurality of openings (76) in the end cap surface (72) are provided near the module's outer peripheral surface (38) and the lip (70) of the brine seal (65) is directionally biased to provide enhanced sealing when the scroll face (31) that abuts the end cap surface (72) is at a lower pressure than the opposing scroll face. As illustrated in FIG. 4c, positioning means (37) on a brine seal (65) may align the seal spacer (65) to the permeate tube (8) or the module's outer peripheral surface (38).

The end cap surface (72) that abuts the scroll face (31) may be joined to the radially extending flexible lip (70) by a sleeve (74) concentrically disposed about the outer peripheral surface (38) of the module (2) and extending along the axis (X). The sleeve (74) preferably provides a fluid seal between the end cap surface and the lip (70). The sleeve (74) is preferably made from a non-porous material and may be a distinct component that is sealed to the lip (70) and end cap surface (72), or that is integral therewith, i.e. a single integral unit, preferably of non-porous material including an elastomeric material. Preferably, the sleeve (74) extends at least 1 cm, preferably at least 2 cm, beyond the abutted scroll face (31). This allows a longer module to be used within a standard pressure vessel while the radially extending flexible lip (70) is able to engage against an inner region of the pressure vessel.

The brine seal (65) is preferably affixed to part of the module (2) so that a fluid seal between the end cap surface (72) and the abutted scroll face (31) is maintained. For instance, the sleeve (74) may be affixed to the outer peripheral surface (38) of the module (2). The end cap surface (72) may be affixed to the scroll face (31). The end cap surface (72) may also be affixed to the permeate tube (8), such as by adhesive or spin welding. It is recognized that a fluid path for feed flow may still exists within the feed spacer (within the module) adjacent the abutted scroll face (31). However, maintaining a seal between the end cap surface (72) and the abutted scroll face (31) prevents feed flow bypass so that at least 95% of feed solution passes through a feed spacer (6) within the module (2).

Figure 5A:
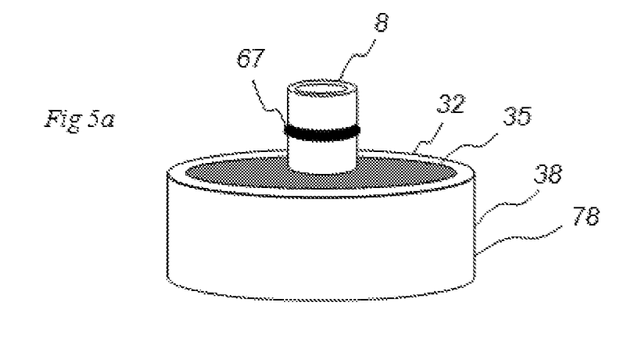
FIGS. 5a, 5b, and 5c are perspective views illustrating three different embodiments of capping members attached to a scroll face of a spiral wound module (partially cut-away).
Figure 5B:
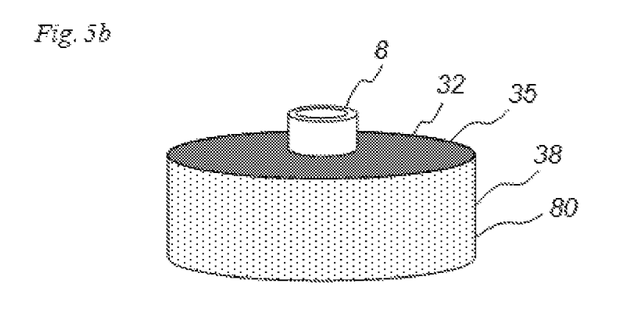
Figure 5C:
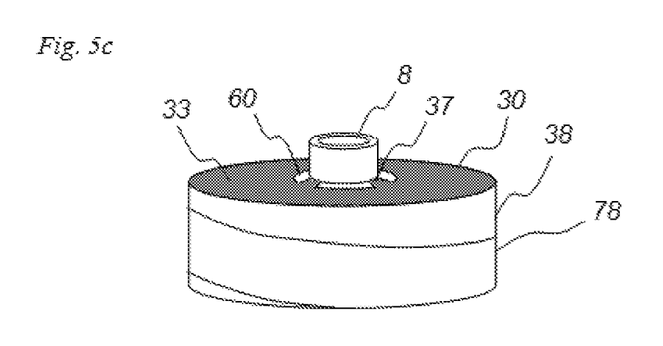

The brine seal (65) restricts flow into or out of a scroll face (30, 32) to specific regions. A end cap surface (72) abutting the inlet scroll face (30) restricts feed flow to areas located near the permeate collection tube (8) and spaced away from the module's outer peripheral surface (38). Similarly, an end cap surface (72) abutting the outlet scroll face (32) may restrict feed flow out of the module (2) to areas of the outlet scroll face (32) near to the outer peripheral surface (38), adjacent the module's outer periphery (39). On the opposite end from the brine seal (65), the means for restricting flow into and out of the module are not particularly limited, but may include the use of sealants (62), as previously described with reference to FIGS. 2a and 2b, or capping members (33, 35) on the scroll faces (30, 32) to promote radial flow. For example, FIGS. 5a and 5b illustrate suitable cap members for the outlet scroll face (32) to prevent a short path for axial feed flow out of the module. FIG. 5c illustrates a cap member for the inlet scroll face suitable to direct initial feed flow to a region near the permeate tube.

The subject brine seal (65) may be used with modules having both sets of feed flow paths illustrated in FIGS. 2a and 2b, and combinations thereof. Consistent with the flow path of FIG. 2b, the embodiment shown in FIG. 4b includes a brine seal (65) on the outlet scroll face (32), with several openings (76) near its outer peripheral surface (38). Consistent with the flow path shown in FIG. 2a, the embodiment of FIG. 4a includes a brine seal (65) on the inlet scroll face (30), an opening (76) near the center of its end cap surface (72), and a module (2) with a porous surface (80) on its outer peripheral surface (38) from which feed flow may exit as concentrate. In the embodiment of FIG. 3, the brine seal (65) may allow feed to exit the module (2) from the vast majority of the outer peripheral surface (38) of the module (2). In this embodiment, the outer peripheral surface (38) is porous and feed may exit the module's outer peripheral surface (38) from a region downstream of the brine seal (65). In FIG. 4a, a sleeve (74) providing a fluid seal between the end cap surface (72) and lip (70) makes it also possible for feed to exit the porous surface (80) from a space beneath the brine seal (65). FIG. 4b illustrates a non-porous surface (78), such that feed fluid would exit as reject through openings (76) in the end cap surface (72). In the filter assembly of FIG. 4c, feed fluid may exit the module (2) only from a porous portion of the outer peripheral surface (38) that is downstream from the brine spacer (65).

The modules and brine seals shown FIGS. 3 and 4a-c also illustrate several other optional features. On either end, the module may have a permeate tube (8) extending beyond the scroll faces (30, 32), or the permeate tube (8) may be flush with a scroll face. To engage with permeate outlet (96) of a vessel (90), the permeate tube (8) may include a seal membrane (67), such as an O-ring, on one or both end(s)— or on neither end. Preferably, an O-ring is attached to the permeate tube (8) nearest the outlet scroll face (32) and opposite the scroll face nearest the brine seal (65). While not shown, the permeate collection tube (8) may further include a sealed end nearest the inlet scroll face (30) so that permeate cannot pass therethrough. Positioning means (37) on a brine seal (67) or capping member (33, 35) may align the cap member to the permeate tube (8) or to the module's peripheral surface (38).

This invention is particular suitable to systems designed for residential use, e.g. those have less than 2 $m^2$ and more preferably less 1 $m^2$ of membrane area. A preferred width of active membrane (25) in the direction of the axis X for such a module is less than 0.5 m. A preferred length of active membrane (25) in the direction perpendicular to the axis X is greater than 1 m. In preferred embodiments, the ratio of median length to median width for active membrane exceeds 2, and more preferably exceeds 3, or even exceeds 4. In conjunction with a feed spacer sheet (6) of high resistance and a geometry (including brine seal (65)) that promotes radial flow, pressure drop between opposing scroll faces (30, 32) can greatly exceed that for conventional operation, particularly after fouling or scaling. In this situation, the sleeve (74) sealing the radially extending flexible lip (70) to the end cap surface (72) abutting a scroll face (30) may further inhibit bypass between the module (2) and brine seal (65).

The invention claimed is:

1. A filter assembly adapted for insertion into an inner chamber of a pressure vessel, wherein the assembly comprises: a spiral wound membrane module (2) comprising at least one membrane envelope (4) and feed spacer sheet (6) concentrically wound about a central permeate tube (8) extending along an axis (X) forming an inlet scroll face (30) and outlet scroll face (32) and a cylindrical outer peripheral surface (38), and a brine seal (65) disposed concentrically about a portion of the outer peripheral surface (38); characterized by the brine seal (65) comprising:
  i) a radially extending flexible lip (70) defining a maximum outer diameter adapted to engage the inner chamber of the pressure vessel,
  ii) an end cap surface (72) sealed to the inlet scroll face (30) which restricts flow through a majority of the inlet scroll face (30), and
  iii) at least one opening (76) in the end cap surface (72) adjacent the permeate collection tube (8) for permitting fluid to flow through the inlet scroll face (30) and into the feed spacer sheet (6) of the module (2) wherein the end cap surface (72) covers at least 75% of the inlet scroll face (30) and restricts feed flow to areas located near the permeate collection tube (8) and spaced away from the outer peripheral surface (38); and
  iv) an outward radial flow path extending through the feed spacer sheet (6) wherein the majority of feed flow enters the module (2) near the permeate tube (8), flows in a radial direction relative to the permeate collection tube (8) and exits the module (2) from: i) the outer peripheral surface (38) or ii) outlet scroll face (32) near the outer peripheral surface (38) of the module (2).

2. The filter assembly of claim 1 wherein in the lip (70) and end cap surface (72) of the brine seal (65) comprise an integral unit of non-porous material.

3. The filter assembly of claim 1 wherein the brine seal (65) further comprises a sleeve (74) concentrically located about a portion of the outer peripheral surface (38) and extending axially at least 1 cm from the lip (70) to the end cap surface (72).

4. The filter assembly of claim 3 and wherein the sleeve (74), lip (70) and end cap surface (72) comprise an integral unit of non-porous elastomeric material.

5. The filter assembly of claim 1 wherein the lip (70) flexes radially outward when subject to fluid pressure that is greater at the first scroll face (30) than the second scroll face (32).

6. The filter assembly of claim 1 wherein the outer peripheral surface (38) of the module (2) comprises a porous surface (80).

* * * * *